Aug. 25, 1931.    S. NAKAGAWA    1,820,579
COLLAPSIBLE MOUSETRAP
Filed Nov. 24, 1928
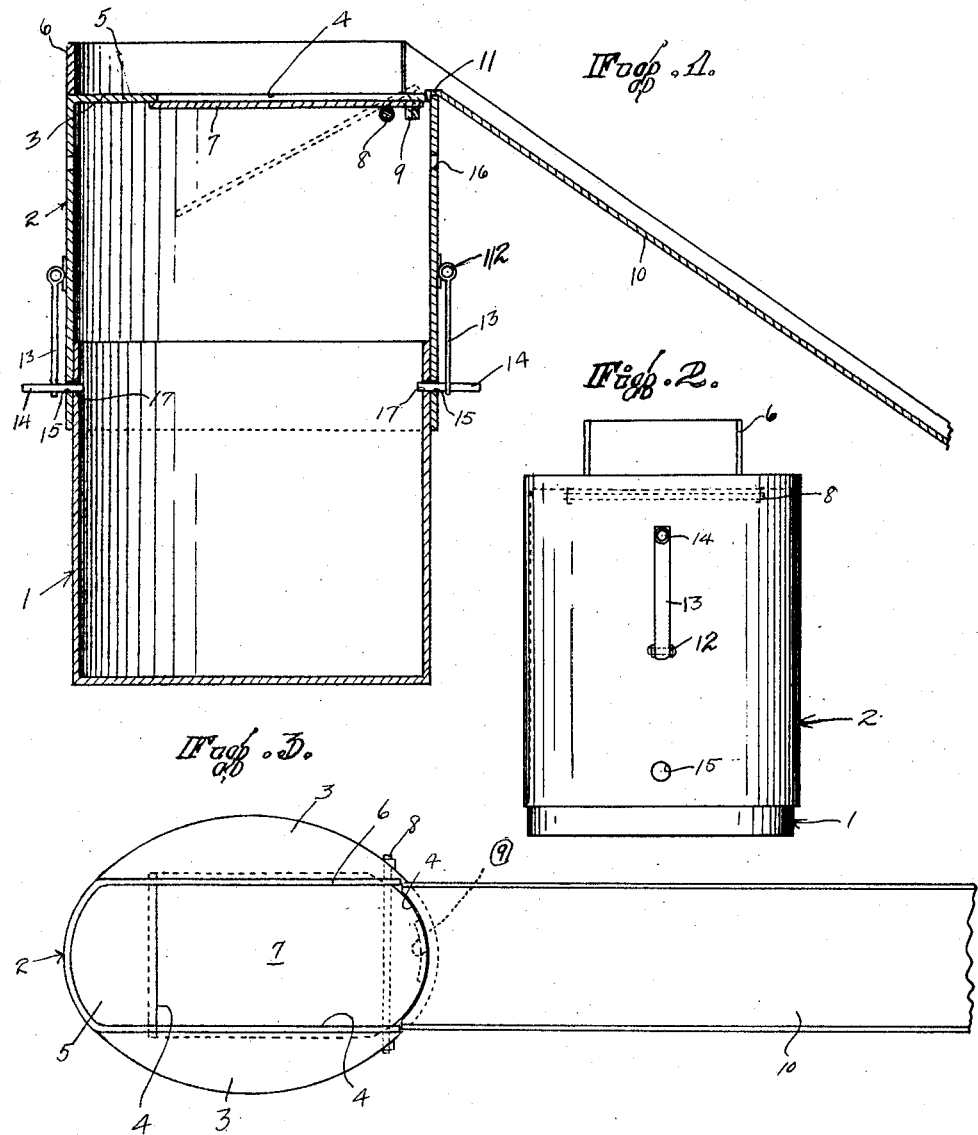
INVENTOR.
S. NAKAGAWA.
BY
ATTORNEY Patented Aug. 25, 1931

1,820,579

UNITED STATES PATENT OFFICE

SHOICHI NAKAGAWA, OF SAN JOSE, CALIFORNIA

COLLAPSIBLE MOUSETRAP

Application filed November 24, 1928. Serial No. 321,577.

This invention relates to mouse traps and has for its purpose the provision of an efficacious trap that can be collapsed into small compass.

One of the objects of this invention is to provide a sturdy mouse trap that may be collapsed for packing or storing.

Another object is to produce a trap whereby the imprisoned rodents may be quickly and easily drowned and with a comparatively small amount of water.

Briefly stated, the invention may be said to reside in the provision of a mouse trap that is collapsible and reducible in size.

Having set forth some of the objects of my invention a more particular description may be had by referring to the drawings in which:

Fig. 1 is a vertical cross section of my apparatus in an extended or working condition.

Fig. 2 is an elevation, when collapsed.

Fig. 3 is a top plan.

As shown in Fig. 1 the trap or imprisoning can is composed of a lower section generally designated 1, and an upper telescoping section designated 2 in its entirety. The top of section 2 is closed by a cover 3 which is provided with an elongated opening 4, said opening being stopped short of one side to provide a shelf 5 suitable for bait. Surrounding the opening on three sides is an upstanding flange 6 which is open on the end away from the shelf 5 and which also encloses the shelf 5. This flange is provided to prevent the rodent from jumping out when he feels himself slipping. Positioned below and entirely closing the opening 4 is a counter-balanced trap door 7 which is pivotally mounted as shown at 8 and counter-balanced as at 9.

The animal enters the trap up the inclined runway 10, which is detachably hooked in place as shown at 11, and which is substantially a continuation of the opening 4. Upon arriving at the top, it must cross over the trap door to get at the bait on the shelf 5, and in so doing operates the mechanism which opens and slides him down into the imprisoning chamber. The door returns to its normal position and is ready for the next victim without the bait having been disturbed.

Pivotally mounted on the upper section 2 as shown at 12 are links 13 which carry pins 14 at their ends. These pins are adapted to be swung into holes 15 and 16 provided in the upper section, and when hole 15 or 16 is brought to coincide with hole 17 in the lower section, an effective means of locking the two sections together is provided.

After an animal has been trapped, the runway 10 is lifted off and the pins 14 are withdrawn. This allows the upper section 2 to slide down over the lower section 1 and shortens the trap to the size shown in Fig. 2. The trap may then be set in a pan of water or water may be poured into it and the rodent drowned.

In the manner shown, the device may be used as a shortened trap. In this case the pins 14 are thrown upward and inserted in holes 16 which are then brought to coincide with holes 17 and a locked position is again effected.

The foregoing description applies to one embodiment of my idea. Since there are modifications and refinements which are applicable to my device without departing from the purview of the appended claims, I reserve this right.

I claim:

1. A mouse trap comprising an imprisoning chamber composed of two telescoping sections, means for locking said sections together in an extended and a shortened position, said means consisting of pins inserted in coinciding holes provided in each section, a trap door at the top of the upper section, and a runway leading to said trap door, and a shelf for bait on the side of the trap door farthest from the runway.

2. A mouse trap comprising an imprisoning chamber composed of two telescoping sections, means for locking said sections together in an upper and a lower position, said means consisting of pins carried by links which are pivotally connected to the upper section and coinciding holes provided in each section into which the pins are adapted to be inserted, a shelf for bait at the top of said upper section, a runway leading to the top of said upper section, and a trap door interposed between said shelf and runway.

SHOICHI NAKAGAWA.